United States Patent
Negoshian et al.

(10) Patent No.: US 10,901,728 B1
(45) Date of Patent: Jan. 26, 2021

(54) ENHANCING DEVOPS WORKFLOWS IN ENTERPRISE INFORMATION TECHNOLOGY ORGANIZATIONS

(71) Applicant: Sentry Insurance a Mutual Company, Stevens Point, WI (US)

(72) Inventors: Nicholas George Negoshian, Stevens Point, WI (US); Robert Maitland Baxter, Stevens Point, WI (US)

(73) Assignee: SENTRY INSURANCE A MUTUAL COMPANY, Stevens Point, WI (US)

( * ) Notice: Subject to any disclaimer, the term of this patent is extended or adjusted under 35 U.S.C. 154(b) by 34 days.

(21) Appl. No.: 16/238,372

(22) Filed: Jan. 2, 2019

Related U.S. Application Data

(60) Provisional application No. 62/612,974, filed on Jan. 2, 2018.

(51) Int. Cl.
*G06F 8/71* (2018.01)
*G06F 8/61* (2018.01)
*G06Q 40/00* (2012.01)

(52) U.S. Cl.
CPC .................. *G06F 8/71* (2013.01); *G06F 8/63* (2013.01); *G06Q 40/12* (2013.12)

(58) Field of Classification Search
CPC .............. G06F 8/71; G06F 8/63; G06Q 40/12
See application file for complete search history.

(56) References Cited

U.S. PATENT DOCUMENTS

| | | | |
|---|---|---|---|
| 9,733,901 B2 | 8/2017 | Bernelas et al. | |
| 10,078,501 B2 | 9/2018 | Narayanan et al. | |
| 10,585,656 B1* | 3/2020 | Das | G06Q 10/103 |
| 2006/0265688 A1* | 11/2006 | Carlson | G06F 8/36 717/101 |
| 2016/0179499 A1* | 6/2016 | Reeves | G06F 9/5027 717/172 |
| 2016/0378449 A1* | 12/2016 | Khazanchi | G06F 8/71 717/120 |
| 2018/0113684 A1* | 4/2018 | Dawson | H04L 67/10 |
| 2018/0157478 A1* | 6/2018 | Wong | H04L 67/02 |
| 2019/0095179 A1* | 3/2019 | Straub | G06F 16/182 |

* cited by examiner

*Primary Examiner* — Ziaul A Chowdhury
(74) *Attorney, Agent, or Firm* — Foley & Lardner LLP

(57) ABSTRACT

Discussed are DevOps systems, methods, and apparatuses that provide a solution for organizing, reporting, and facilitating the automation of deploying infrastructure, platform, and application code for an IT enterprise. A logical data model for organizing components of the DevOps approach may include inventories for systems, environments, applications, resources, and deployments. A set of components may be built to provide an organizational structure to collect, report, and facilitate the automation of applications and the deployments of those applications across the enterprise. An artifact inventory may be used to request a deployment of specific versions of artifacts to an environment, providing a complete picture of what the environment should contain after a deployment. This inventory may be linked to business-level system inventory tracking as well as low-level computing resource tracking to provide a complete picture of total cost of ownership.

20 Claims, 8 Drawing Sheets

| Institution | System deployment information | | | | | Please Provide Feedback 😊 | | User1 |
|---|---|---|---|---|---|---|---|---|
| Deployment View | ▓ System View | Search ▼ | Requests ▼ | Reports ▼ | ✱ System Support | Administration ▼ | Help ▼ | ⸮ Search System Support |
| | | | | | | Request Assistance | | |

Deployment View  ☐Show detail (Switch to application detail view)  ☐Live Updates Filter [All ▼]

[25] per page  [⸮ Search]

| | System Asset | KeyCode | Named Environment | Status | Deployment Date | |
|---|---|---|---|---|---|---|
| | *Filter System Asset* | *Filter KeyCode* | *Filter Named Environment* | *Filter Status* | *From* | *To* |
| ▼▓↑★ 41680 | System 1 | SYS1 | QUAL [Newer Version Available] | ● Completed | 11/09/2018 02:18:41 PM | |
| ▼▓↑★ 41684 | System 1 | SYS1 | TEST | ○ In progress | 11/09/2018 02:16:05 PM | |
| ▼▓↑★ 41681 | System 2 | SYS2 | TEST | ● Completed | 11/09/2018 02:14:52 PM | |
| ▼▓↑★ 41683 | System 3 | SYS3 | PROD [Newer Version Available] | ○ In progress | 11/09/2018 02:13:38 PM | |
| ▲▓↑★ 41682 | System 3 | SYS3 | TEST Scheduled | ○ In progress | 11/09/2018 02:12:45 PM | |

Application "A"
Code (version 1234) (New)

Application "B"
Code (version 1235)

Application "C"
Code (version 2042)

Application "D"
Code (version 25)

Application "E"
Code (version 5) (New)

Showing 1-5 of 813

| Previous | 1 | 2 | 3 | 4 | 5 | ... | 33 | Next |

Figure 4

| Institution | System deployment information | | | | Please Provide Feedback 👋 | | | User1 |
|---|---|---|---|---|---|---|---|---|
| Deployment View | ⊞ System View | Search▼ | Requests ▼ | Reports ▼ | ✳ System Support | Administration ▼ | Help ▼ | ⚙ Request Assistance | ✧ Search System Support |

Deployment Request

| | | |
|---|---|---|
| System Asset | System 1 ▼ | Created Date | 11/9/2018 2:17:17 PM |
| Named Environment | TEST ▼ | Created By | User1 |
| Request Type | Standard ▼ | Submitted By | |
| Status | Created ▼ | Scheduled Date | 🗓 |
| Estimated Deployment Time | 0 hours 10 minutes 40 seconds | | |

[ Reset ] [ Submit Request ] [ Delete Request ]

SQL Requests

Pre-Code Deploy       Post-Code Deploy

[ + Add SQL Request ]

Applications   ☑ Administrator Detail   [ Update all ]

| X [Common] (Configuration Settings) | X Application "A" (Configuration Settings) |
|---|---|
| X Resources   Ver # ** (Default) | X AppPlatform   Ver # ** (Default)   [ Newer Version Available ] |
| X Identities   Ver # ** (Default) | X Code   Ver # (Default)   [ Newer Version Available ] |
| [ + Add Artifact ] | [ + Add Artifact ] |

[ + Add Application ]

Legend
**Artifact version can only be used in this Named Environment

Figure 5

| Institution | System deployment information | | | | | Please Provide Feedback | | | User1 |
|---|---|---|---|---|---|---|---|---|---|
| Deployment View | ▦ System View | Search ▼ | Requests ▼ | Reports ▼ | ✻ System Support | Administration ▼ | Help ▼ | ✷ Request Assistance | ⸎ Search System Support |

✻ Named Environment Support

Named Environment  TEST ⬈

System  ✻ System 1

Type  Non Prod

Purpose  [                    ] Edit ✎

| Resources ↕ | Databases | Deploys | |
|---|---|---|---|
| ☐ ~WEB SERVER NAME~ | ▮ SUPPORT DATABASE(Used) | Latest | |
| runs: APPLICATION "A" (Web) SEL | DATABASE SERVER NAME ⊕✻ | ▼Submitted 11/9/2018 2:17:27 PM | Completed 11/9/2018 2:27:34 PM ✱ |
| ☐ ~BATCH SERVER NAME~ | ▮ TEST DATABASE(Owned) | Recent | |
| runs: APPLICATION "B" (APPLICATION "B") SEL | DATABASE SERVER NAME ⊕✻ | ▼Submitted 11/9/2018 9:17:40 AM | Completed 11/9/2018 9:31:55 AM ✱ |
| | | ▼Submitted 11/8/2018 2:23:51 PM | Completed 11/9/2018 2:39:06 PM ✱ |
| | | ▼Submitted 11/8/2018 8:51:31 AM | Completed 11/9/2018 9:06:16 AM ✱ |
| | | ▼Submitted 11/7/2018 3:28:42 PM | Completed 11/9/2018 3:42:41 PM ✱ |
| | | ▼Submitted 11/7/2018 11:12:46 AM | Completed 11/9/2018 11:24:43 AM ✱ |
| | | Scheduled | |
| | | There are no scheduled deployments | |

◀ Back to System Support

Figure 7

ENHANCING DEVOPS WORKFLOWS IN ENTERPRISE INFORMATION TECHNOLOGY ORGANIZATIONS

CROSS REFERENCE TO RELATED APPLICATION

This application claims priority to U.S. Provisional Patent Application No. 62/612,974 entitled "SYSTEMS AND METHODS FOR ENHANCING DEVOPS WORKFLOWS IN ENTERPRISE INFORMATION TECHNOLOGY ORGANIZATIONS," filed Jan. 2, 2018, and incorporated herein by reference in its entirety.

TECHNICAL FIELD

Embodiments of the present disclosure relate generally to methods and systems for inventorying, tracking, and orchestrating software development and operations (DevOps) workflows.

BACKGROUND

More and more companies depend heavily on their information technology (IT) infrastructure to provide customers with goods and services. The competitiveness of a company can be very dependent on the ability of a company to have the software that meets customer needs and to update that software as needs change and according to the dictates of market forces. On the development side, software developers at IT organizations write code for new products and for new features, security updates, and/or bug fixes for existing products. That code is written in a production environment that is consistent with the current state of IT systems. Once code is written, however, it can take time (e.g., days or weeks) for the new code to be deployed (i.e., be placed into production or otherwise implemented) on the operations side. Delays in deployment can lead to unforeseen errors, as the production environment in which the new code is deployed may differ in some respects from the development environment. Because of dependencies between new code and other parts of the evolving production environment, adjustments may be needed (to the hardware and/or to the software of the production environment) at deployment. And once new code is deployed, errors resulting from the deployments may need to be addressed. Companies facing excessive delays in IT development and operations could be at a competitive disadvantage relative to companies that are able to more quickly develop and deploy new or updated code.

DevOps (a reference to "development" and "operations") is a software engineering approach aimed at integrating software development ("Dev") and software operation ("Ops"). Increased collaboration between the development team and the operations team can reduce delays by, for example, providing the development side with feedback from the operations side to reduce the time needed to rework developed code. But existing continuous delivery services only have basic organizational structures to group applications together in folders. And existing application lifecycle management services organize on the concept of a "project" that does not reflect varied relationships between applications, systems, business areas, and resources.

Moreover, conventional DevOps tools are not well suited to the needs of large organizations. The applications portfolio of an enterprise IT organization tends to be large and diverse, and does not fit into a single delivery pattern. The portfolio can include "out of the box" vendor-provided software, custom in-house development, and applications that are a mix of both. There can be multiple technology stacks in use, with different processes around building and deploying code.

Existing DevOps systems do not sufficiently address enterprise IT challenges. What is needed are systems and methods that address one or more of the above, as well as other, features including managing the large number of running environments and dependencies between applications in each environment, managing the environments on which particular applications are deployed, and managing the resources being used, the associated costs, and for the life cycle of applications across an enterprise.

SUMMARY

Various embodiments of the disclosure relate to a development and operations (DevOps) method for managing a portfolio of applications in an enterprise. An inventory of artifacts may be used. Each artifact may be an immutable versioned component of a deployable application in the enterprise. The method may comprise generating a set of artifacts. The set of artifacts may be associated with a named environment of a defined system in the enterprise. The set of artifacts may include a first artifact file. The first artifact file may identify computing hardware resources in the named environment. The set of artifacts may also include a second artifact file. The second artifact file may identify software specifications in the named environment. The set of artifacts may moreover include a third artifact file. The third artifact file may include executable code to run in the named environment. The executable code may be run using the computing hardware resources identified in the first artifact file and/or the software specifications identified in the second artifact file. The method may also comprise creating a deployment. The deployment may be created by selecting one or more applications. The deployment may alternatively or additionally be created by selecting one or more artifacts from the set of artifacts. Artifacts may be selected in association with selected applications. The method may moreover comprise deploying the selected artifacts. Deployment may comprise virtually modifying one or both of the computing hardware resources and the software specifications in the named environment according to the first and second artifacts. The deployment may alternatively or additionally comprise running the code from the third artifact.

In various implementations, versioned artifacts may be registered in the inventory of artifacts via a common application programming interface (API).

In various implementations, the set of artifacts may further include a fourth artifact. The fourth artifact may define identities. The identities may be used in running the code in the named environment.

In various implementations, the deployment is created via a deployment request graphical user interface.

In various implementations, artifacts are selected by an identifier and a version.

In various implementations, the defined system corresponds with a business role and/or one or more stakeholders.

In various implementations, a cost associated with an application may be determined. The cost may be determined based at least in part on expenses incurred for corresponding virtual modifications to the named environment made according to selected artifacts.

In various implementations, a total cost associated with the defined system may be determined. The total cost may be determined based at least in part on expenses incurred for modifications to named environments in the defined system.

In various implementations, a cost report identifying expenses may be generated. The expenses may be for at least one of a set of one or more deployments, a set of one or more applications, a set of one or more named environments, and a set of one or more defined systems.

Various embodiments of the disclosure relate to a DevOps system for managing a portfolio of applications in an enterprise using an inventory of artifacts. Each artifact may be an immutable versioned component of a deployable application in the enterprise. The DevOps system may comprise a processor and a memory having instructions stored therein that, when executed, cause the processor to perform specific functions. The DevOps system may be configured to generate a set of artifacts associated with a named environment of a defined system in the enterprise. The set of artifacts may include a first artifact file. The first artifact file may identify computing hardware resources in the named environment. The set of artifacts may also include a second artifact file. The second artifact file may identify software specifications in the named environment. The set of artifacts may moreover include a third artifact file. The third artifact file may include executable code to run in the named environment. The executable code may be run using the computing hardware resources identified in the first artifact file and/or the software specification identified in the second artifact file. The DevOps system may also be configured to create a deployment by accepting selections of one or more applications. The deployment may additionally or alternatively be created by accepting one or more artifacts from the set of artifacts. Artifacts may be selected in association with selected applications. The DevOps system may moreover be configured to deploy the selected artifacts. The selected artifacts may be deployed by virtually modifying one or both of the computing hardware resources and the software specifications in the named environment according to the first and second artifacts, respectively. The selected artifacts may also be deployed by, alternatively or additionally, running the code from the third artifact.

In various implementations, the DevOps system is configured to register versioned artifacts in the inventory of artifacts via a common API.

In various implementations, the DevOps system is configured to generate a fourth artifact in the set of artifacts. The fourth artifact may define identities. The identities may be used in running the code in the named environment.

In various implementations, the DevOps system includes one or more user interfaces configured to receive user inputs and/or visually present graphical user interfaces. The DevOps system may be configured to accept selections of applications and/or artifacts via a deployment request graphical user interface.

In various implementations, the deployment request graphical user interface is configured to accept selections of artifacts by identifier and version.

In various implementations, the defined system corresponds with a business role and/or one or more stakeholders.

In various implementations, the DevOps system is configured to determine a cost associated with an application. The cost may be determined based at least in part on expenses incurred for corresponding virtual modifications to the named environment made according to selected artifacts.

In various implementations, the DevOps system is configured to determine a total cost associated with the defined system. The total cost may be determined based at least in part on expenses incurred for modifications to named environments in the defined system.

In various implementations, the DevOps system is configured to generate a cost report. The cost report may identify expenses for at least one of a set of one or more deployments, a set of one or more applications, a set of one or more named environments, and a set of one or more defined systems.

Various embodiments of the disclosure relate to a non-transitory computer readable medium having machine instructions stored thereon, the instructions being executable by a processor of a DevOps system to cause the processor to perform operations for managing a portfolio of applications in an enterprise. The portfolio of applications may be managed using an inventory of artifacts. Each artifact may be an immutable versioned component of a deployable application in the enterprise. The operations may comprise generating a set of artifacts associated with a named environment of a defined system in the enterprise. The set of artifacts may include a first artifact file. The first artifact file may identify computing hardware resources in the named environment. The set of artifacts may include a second artifact file. The second artifact file may identify software specifications in the named environment. The set of artifacts may include a third artifact file. The third artifact file may include executable code to run in the named environment using the computing hardware resources identified in the first artifact file and/or the software specification identified in the second artifact file. The operations may also comprise creating a deployment. The deployment may be created by selecting one or more applications. The deployment may alternatively or additionally be created by selecting one or more artifacts from the set of artifacts. Artifacts may be selected in association with each application selected. The operations may moreover comprise deploying the selected artifacts. The selected artifacts may be deployed by virtually modifying one or both of the computing hardware resources and the software specifications in the named environment according to the first and second artifacts, respectively. The selected artifacts may also be deployed by running the code from the third artifact.

In various implementations, the instructions may cause the processor to register versioned artifacts in the inventory of artifacts via a common API.

BRIEF DESCRIPTION OF THE FIGURES

FIG. 4 is an example "deployment view" showing existing deployments that are completed or in progress and showing the defined system and named environment for each deployment, with an expansion of one of the deployments to show details on applications deployed and artifacts associated with each application, according to one or more embodiments.

FIG. 5 shows an example deployment request graphical user interface that may be used by a developer wanting to perform a deployment, according to one or more embodiments.

FIG. 7 shows an example deployment support graphical user interface providing information on deployments in a named environment, according to one or more embodiments.

DETAILED DESCRIPTION

Figure 1A:
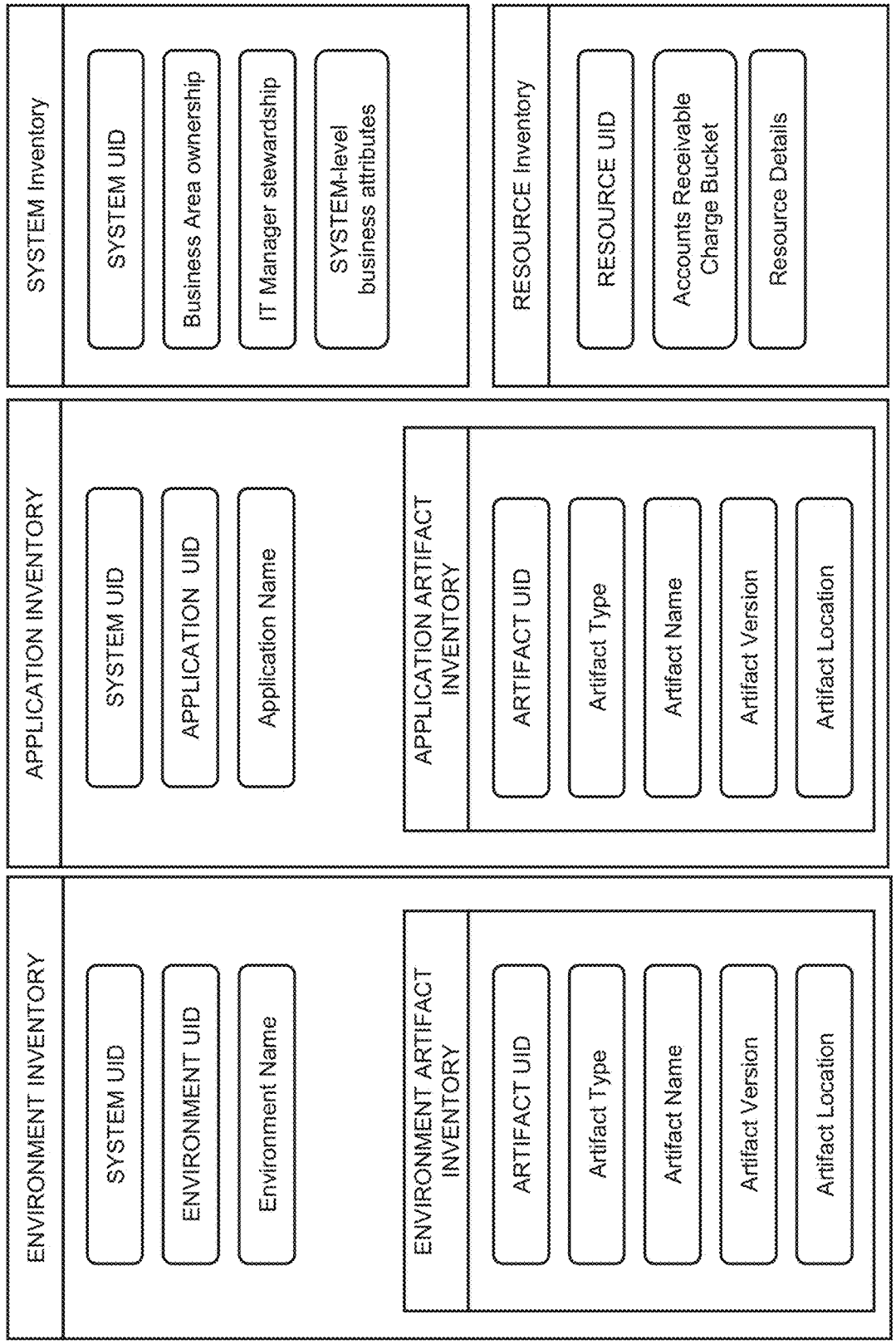
FIGS. 1A and 1B provide an example logical data model, according to one or more embodiments of the disclosure.

Example embodiments of the disclosure enable better management of applications across many named environments in a DevOps system, rather than managing a single application at a time. In simple situations, a single application may be an entire DevOps system, but the disclosed approach is suited to situations in which dozens or hundreds of applications make up a DevOps system. As further discussed below in the context of a domain-specific language (DSL), "defined systems" in the DevOps system may have dozens of different "named environments" with various features and functionalities, such as performance testing, user acceptance, integration with different organizations, various workflows on different timelines, etc. Use of a single inventory allows for applications to be deployed in the same way. In various embodiments, the inventory includes three buckets. At a first level, system-level business attributes identify, for example, business areas to which a defined system belongs, users able to approve change, stakeholders, users managing the defined system, etc. A second level may identify what is available to be incorporated into versions of code for deployment (e.g., actual machines used for the deployment, server names, IP addresses, hardware configurations, number of CPUs, amount of RAM, version of an operating system, etc.). A third level may identify, catalog, track, and archive versions of infrastructure as code. In various implementations, with these three buckets, an entire portfolio of applications can be better managed together.

In example implementations, each application is associated with four artifacts. A first artifact identifies the hardware resources needed to run the application (e.g., a given version of a server operating system with a certain number of CPUs, a certain amount of RAM, and a certain amount of hard drive space). A second artifact identifies a platform on which the application should run (e.g., a certain version of a component of a web server that interacts with servlets, such as a servlet container or web container, with a certain patch level). A third artifact provides the identities used to run the application (e.g., a particular service account and a username and password for connecting to its SQL database). A fourth artifact includes the application code (e.g., a zip or a jar of the compiled code). Each artifact is versioned independently. If, for example, an additional CPU is needed or other hardware change is to be made, a file identifying resources (artifact 1) can be updated. If the Java version is being updated or other platform change is made, a platform file (artifact 2) can be updated. If there is a new version of code, the code file (artifact 3) could be updated. And if the identities are to be changed, the identities file (artifact 4) would be updated. All the artifacts are deployed together as one request of the complete state of the corresponding environment. At time of deployment, the servers are created or updated to match the definition in the resources file (artifact 1), the software environment in which the application is running are updated according to the specifics in the platform file (artifact 2), and the code (artifact 3) is deployed such that it runs using the identities specified in the identities file (artifact 4). The sum collection of artifacts for an environment represents the exact state of that environment.

Each named environment may be configurable such that deployments are manual only or automated according to certain parameters. For example, a new deployment can be created in response to new versions of artifacts being recorded, either immediately or on a specified schedule. This allows for better support of various types of life cycles in the project portfolio. For example, continuous integration can be supported via automatic deployments to test environments, continuous delivery can be supported via automatic deployments to production environments, or each defined system and named environment can be manually configurable. Because environments are virtualized, if an artifact identifies two gigabytes of RAM, and an update changes that to eight gigabytes in a new version, at deployment of the new version, the virtual OS and the amount of RAM assigned to it can be updated.

The DevOps system may use a common API. In various implementations, each time there is a change to an artifact, a call to the API is made to register the new version of the artifact. Depending on how the corresponding named environment is configured, registration of a new version of an artifact can trigger a deployment of the latest version, or deployment may await an instruction from an authorized user. In some implementations, all applications or underlying built systems or source control systems can communicate with a restful endpoint of a common API. The API is tied into a DSL to record artifacts, and/or to retrieve information about, for example, deployments, defined systems, or resources being used. A common API enhances overall integration so that components of the system are platform or vendor agnostic, allowing for plug-and-play incorporation of many different technologies. For example, in certain implementations, use of a web-based API allows for inclusion of various vendor packages that compile in different ways using different build engines contributing build artifacts to the API. Examples include: an automation server written in Java that helps to automate the non-human parts of the software development process; a software product that provides source code management, reporting, requirements management, project management (e.g., for agile software development and/or waterfall teams), automated builds, lab management, testing, and/or release management capabilities; a web-based version control repository hosting service for source code and development projects that use various revision control systems; and/or a software versioning and revision control system usable to maintain current and historical versions of files such as source code, web pages, and documentation Through a web-based open API specification restful endpoint, diversified tools can be integrated to create the various different artifacts. In some versions, the API is provided with a new version of code by identifying a version number and a location of the code.

Prior to the disclosed approach, if additional hardware were needed (e.g., an additional four gigabytes of memory was needed in a machine), an applications development team would push changes to code to take advantage of the additional memory, a server team would coordinate a time to change the memory size on the machine, and a platform team would change various parameters in the running platform (e.g., Java, Java virtual machine parameters) to more fully take advantage of the added memory. All three teams would need to coordinate making their corresponding changes, picking an outage window and performing their actions while all three are "in the room" together. Embodiments of the disclosed approach may still involve the three teams, but instead of all having to be together at the same time, the server team can create a new version of a hardware artifact to represent the updated memory, the platform team can update a platform definition artifact to represent use of the new parameters, and the application developers can make the code changes and check in and record the changed code in a code artifact. All three of the changes can be scheduled as part of the same deployment, occurring at the same time, and no user needs to be present for those changes to take effect.

Consequently, rather than coordinating these actions across multiple teams, teams are able to make their changes independently of what is going on currently in the production system, and then batch the changes into a single release that makes multiple changes based on the work of the multiple teams. Changes, rather than being applied manually (e.g., make a change to a physical server), can be applied by identifying an end result of the change (e.g., the state of the machine following the change, such as a specified amount of memory). In some implementations, the new end state (e.g., six gigabytes of RAM) may be identified by a user to create a new version of the corresponding artifact to show six gigabytes of RAM as the final end state. When it is time for all changes to be deployed, a user may generate a deployment request that includes all three changes to be implemented at once. The system may then compare the current state of the corresponding named environment with the desired end result, and automatically perform a set of changes to reach the desired state.

A unique DSL provides certain advantages. For example, the DSL allows for expenses to be charged back to various business units in a way that could not be accomplished before. For example, the costs of changes to a defined system X, known to be part of business unit Y, for example, allows for determination of total cost of ownership (TCO) by business unit. Further, for any given deployment, knowing the defined system, named environments, and all of the particulars of the artifacts takes out the guesswork and manual cross-referencing that was previously required. For example, when a new (virtual) server is created, where the new server will reside, what it will be named, etc., is determined, in a standardized fashion, according to the DSL. The defined system will be associated with the new server, and the business unit information and named environment (e.g., production) determines, for example, where the server will reside.

In various embodiments, the DSL provides a foundation that allows for better management of a larger and more diverse application portfolio. Otherwise, there would be isolated pockets in which automation occurs in different ways, and the entire portfolio and TCO would not be as readily evident. Built on that foundation, tasks and processes can be automated that could not be automated before. New technologies can be more rapidly adopted (e.g., cloud technologies) because there is a reference point for each component of the system for charging of costs, and assigning the right level of business ownership. Without the disclosed approach, business areas would have siloed implementations of automation and cloud services: different business units, different stakeholders, different application types, and different development teams would result in custom implementation of the entire delivery stack throughout the organization. With the disclosed approach, there can be a single unified version that can be managed as a single shared service. Every team can have independence and autonomy for the things that they control, and tie it into the overall DevOps system so that the different teams across the organization can speak the same language when it comes to, for example, time to deploy an application, what is deployed, etc.

In various embodiments, different teams across an organization can use the same graphical user interface to, for example, see the current state across all defined systems and named environments of what is deployed. The graphical user interface may include, for example, the latest deployment for every defined system and named environment, and the deployments can be filtered by defined systems that a developer or manager has control over or would be deploying. Particular deployments can be marked for tracking to allow users to more easily follow and understand systems (either within their organization or across the entire enterprise). Rows on the graphical user interface can be expandable to allow users to drill down into details through multiple different channels. Users can drill into specific details of deployments by viewing deploy logs to see exactly what was performed by the automation system to reach a desired state. Users can drill into various different views at the defined system level, and/or view named environment level data to see the resources, history of deployments, business owners and other roles, etc.

In example implementations of the DSL, a defined system is a business-level name given to a group of applications that make up the system. Each defined system can be given a key code (e.g., an immutable four-digit code that represents that system). A named environment may be a specific instance of applications deployed. In various embodiments, each system includes a test environment and a production environment. Deployments can occur in selected named environments.

Embodiments of the present disclosure relate to enhanced DevOps systems, methods, and apparatuses that provide a solution for organizing, reporting, and facilitating the automation of deploying infrastructure, platform, and application code for an IT enterprise. An example logical data model for organizing a DevOps system is depicted in FIG. 1, which shows that inventories may be maintained for systems, environments, applications, resources, and deployments, as will be further discussed below. The example DevOps system may include a set of components built to provide an organizational structure to collect, report, and facilitate the automation of applications and the deployments of those applications across the enterprise. Embodiments may offer a well-defined DSL and communication endpoints that allow for integration with any continuous integration (CI) and/or continuous delivery (CD) system or systems (which provide an automated means to build code from a source repository and deploy that code to named environments), and provide consistent, reliable inventory of applications, artifacts, named environments, and deployments across an enterprise. Build artifacts for application code and environment configuration (which may be referred to as "infrastructure as code") may be recorded into the DevOps system. In various implementations, no changes need to be performed to any machine by human hand, they may be defined as a desired state to be applied by automation and are recorded as a version of what that named environment application would look like. Such an artifact inventory may then be used to request a deployment of specific versions of artifacts to a named environment, providing a complete picture of what the environment should contain after a deployment. This inventory may be linked to business-level system inventory tracking as well as low-level computing resource tracking to provide a complete picture of TCO.

"Resource Inventory" is associated with a UID and with an accounts receivable charge bucket. Resource details include size of a resource (CPU, memory, disk, etc.), location of hardware, hardware generation, OS level, etc. Potential roles may include "primary" and "backup." As newer features and services are incorporated, additional resource types may play non-traditional roles that could be captured here, in various embodiments.

The disclosed approaches uniquely address challenges of Enterprise DevOps in several ways. In example embodiments, a DSL for enterprise IT may be used to describe and organize a diverse application portfolio into "defined systems" and "ecosystems" that contain one or more "applications." The "named environments" that a defined system uses may be described, as can the "artifacts" (e.g., a version of code that is built) created for the one or more applications. The artifacts deployed to those named environments can also be identified as a "deployment," as can the computing "resources" (e.g., servers) that are used in those named environments.

Example embodiments provide the ability to register versioned code artifacts created from diverse build platforms through a common API that does not require changing the build tools in use. This also includes the ability to register IAC as an artifact through the same mechanism. A single, common graphical user interface may be provided for requesting a deployment to a "named environment" in terms of "artifacts" desired to be deployed. A deployment engine that is "plug and play" may be provided, with providers for each type of artifact to perform the work of deploying and logging the "deployment" performed into the DevOps system. Additionally, a single, common graphical user interface may be provided for viewing and reporting on deployments across an application portfolio, organized by the DSL. This allows, for example, analysis and reporting of costs at, for example, the defined system level, named environment level, ecosystem level, etc., by all computing resources (e.g., all computing equipment involved), one or more types of computing resource (e.g., servers), etc.

In various embodiments, a common inventory and deployment orchestration mechanism for all applications and all defined systems across the entire enterprise portfolio is provided. An organizational and auditing structure provides for one inventory at the defined system level, rather than at the code level. The structure provides a one-to-many collection of applications that may include the same code base or may include separate code bases, with all part of one atomic unit. Collection of metadata (e.g., as code enters and progresses through the DevOps system and evolves over time) allows for enhanced inventorying and orchestration of activities. Metadata is collected about what makes up each defined system, and is not just focused on code delivery with no consideration of the business organization behind the code. The defined system can provide the ability to clone and stamp out a copy for a test environment or an additional demonstration environment.

Embodiments provide for an inventory system that inventories changes (to code, hardware, etc.) at the defined system level. The inventory system provides metadata about ownership, role information, who is the appropriate business area representative to make decisions about that defined system, who is the appropriate custodian in IT to make decisions about that defined system, and various other metadata that belongs at the defined system level. The inventory system may inventory by defined system both the applications that are part of the defined system, and the named environment to which that system deploys. There may be many named environments in a defined system, and all applications that are part of all named environments in the defined system may be inventoried. When a deployment occurs, the inventory identifies, for example, the servers (and equipment) the code was deployed on, what versions of code, what versions of desired state configuration, etc., providing a complete end-to-end picture. This approach allows users to bridge the gap between the business level information, the code deployment level information, as well as the physical server footprint information.

Figure 1B:
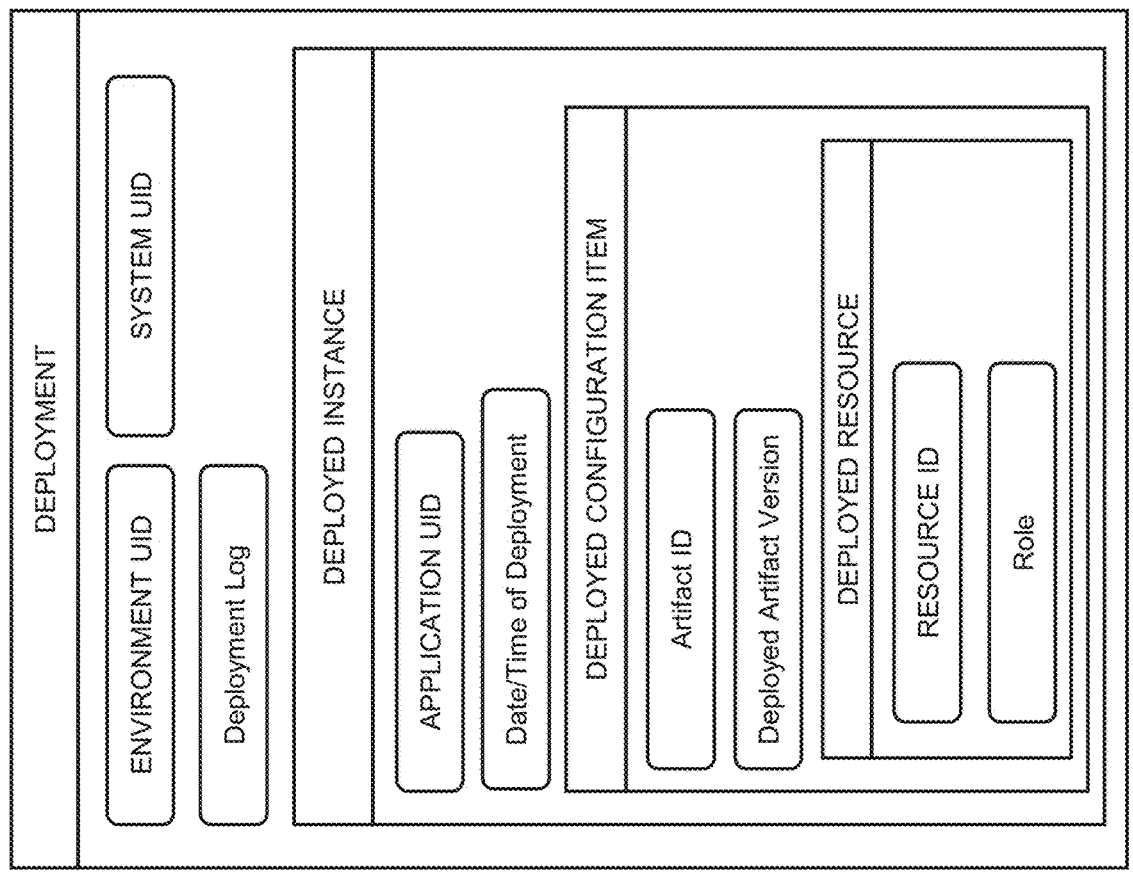

FIGS. 1A and 1B provide a logical data model for DevOps system organization. In FIG. 1A, each of the "Environment" and "Application" Inventories are associated with a defined system, as indicated by system UID. Environment and Application have their own UIDs (i.e., environment UID and application UID) and names (i.e., environment name and application name). Under the artifact inventories associated with environment and application (i.e., "Environment Artifact Inventory" and "Application Artifact Inventory"), each artifact is associated with a UID, type, name, version, and location. Artifact types are a means of classifying and organizing artifacts by their purpose. Examples include code, resources, platform, certificates, identities, grants, etc. Artifact locations refer to the physical location(s) of the artifact. Examples include a file system path, a URL, cloud based storage repository, etc. "System Inventory" is associated with a system unique identifier (UID), as well as an identification of the associated business area ownership and IT manager stewardship. System-level business attributes are items that an enterprise may choose to inventory and track that are relevant to the enterprise's business. Attributes may be added and changed over time. Examples include a business description of what this defined system does, hours of availability, the number of users of the defined system, etc.

"Resource Inventory" is associated with a UID and with an accounts receivable charge bucket. Resource details include size of a resource (CPU, memory, disk, etc.), location of hardware, hardware generation, OS level, etc. Potential roles may include "primary" and "backup." As newer features and services are incorporated, additional resource types may play non-traditional roles that could be captured here, in various embodiments.

FIG. 1B models deployments, which are associated with an environment UID, system UID, and a deployment log. Each deployed instance is associated with an application UID, a date/time of deployment, and a deployed configuration item, or artifact. Each artifact is associated with an artifact ID, a deployed artifact version, and a deployed resource, which is in turn associated with a resource ID and a role.

Terms and systems: the diagram in FIG. 2 outlines components (Dashboard of Environments, "Inventory Database of System Assets," resources (Utility for Management of Hardware Configurations, Automation, etc.) that will be responsible for each of the terms discussed below. In the disclosed DevOps focused integration, the term "operations" refers to the ability to automate and track the work to utilize computing resources. And "cost analysis" refers to the ability to review and analyze costs, usage and history metrics. Other terms used herein will now be explained.

Figure 2:
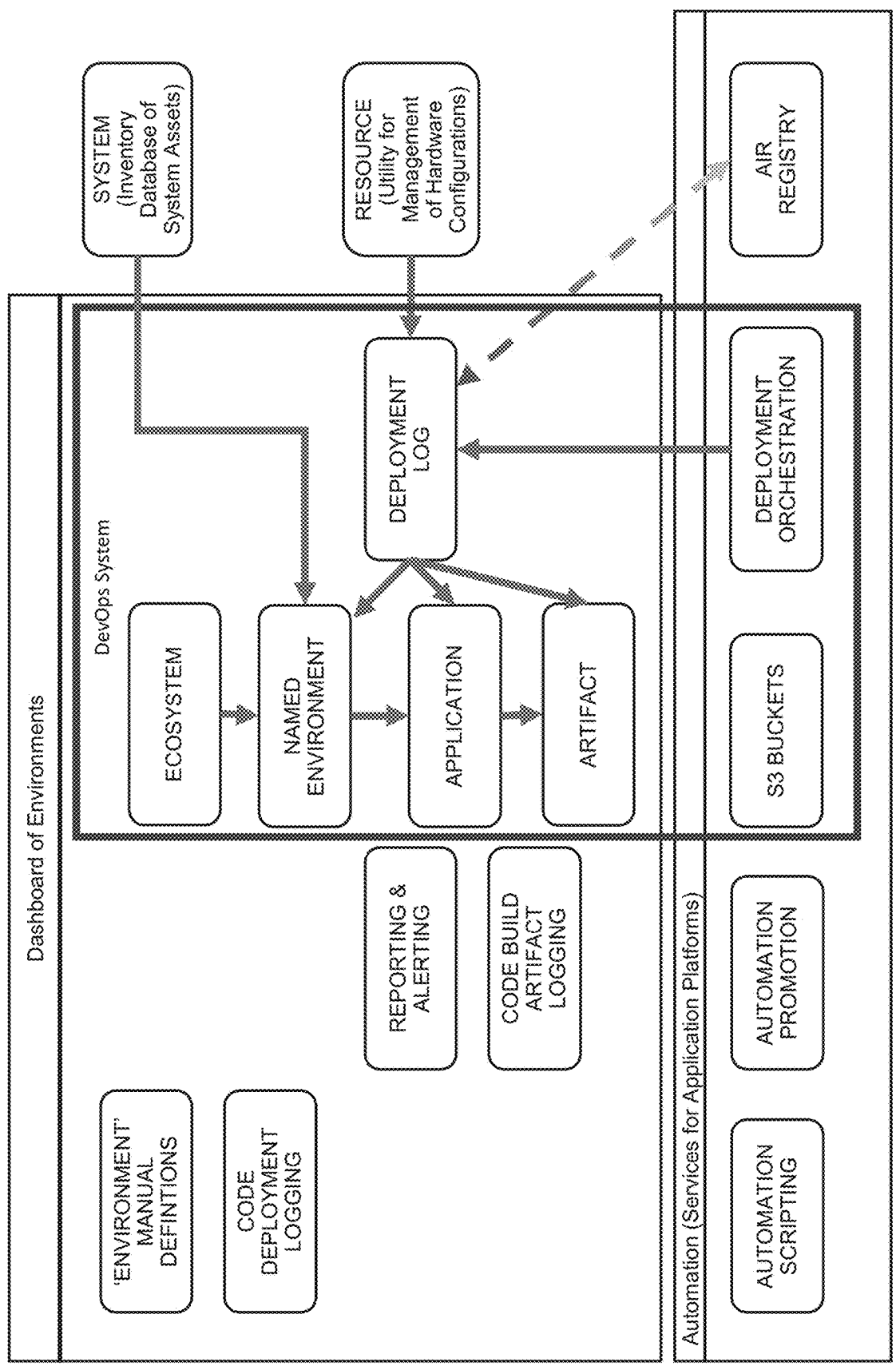
FIG. 2 depicts an outline of example systems ("Dashboard of Environments," "Inventory Database of System Assets," "Utility for Management of Hardware Configurations," and "Automation") that may be responsible for various components (such as defined systems, named environments, etc.), according to one or more embodiments.

In FIG. 2, Inventory Database of System Assets is a system that tracks inventory of systems, and the Utility for Management of Hardware Configurations is a system that tracks the inventory of resources (referred to as hardware). "Automation scripting" is associated with tools for deploying environments, and "automation promotion" refers to promoting automation scripting work for use in the DevOps process. "Storage" refers to storage available for artifacts and the DevOps process. In certain implementations, if there has been no manual intervention, this aligns with information about deployments. Steps taken as part of "deployment orchestration" may be determined based on, for example, the presence or absence of artifact files, and in some cases, the contents of the artifacts.

RESOURCE—an instance of usable computing that has a named identifier and is immutable in operation and purpose. A resource may not always be the lowest level of usage reporting available, for functions such as auto-scaling. Information to store about resources include: unique resource name/identifier (useful for, e.g., operations, cost analysis, etc.); size (operations, cost analysis); business unit/accounts receivable "bucket"; resource type/role.

APPLICATION—a (uniquely named) collection of one or more logically related, deployable configuration items (aka "artifacts") that has the following characteristics: (1) changes to the application's configuration items are versioned and under source control; (2) a version of the item can be created from source control as an application artifact; and (3) is contained by one and only one defined system. Examples of applications include a web site, a web service, a batch application, a database definition (schema, stored procedures, etc.), and a message queue definition. Message queues and databases are examples of configuration types that can be stand-alone applications or sub-components of a larger application. Information to store about applications may include: application ID and name (operations, cost analysis); location and history of configuration artifacts (operations); defined system that the application belongs to (operations, cost analysis).

ARTIFACT—an immutable versioned component of a deployable application. This is a configuration item that either defines the desired end state and/or changes to be performed, or is physically copied without modification for deployment. An exception to this rule may be the injection of an environment name into the artifact at stage/deploy time). Artifacts are usually created as output of a build process. Examples of artifacts include: application platform json definition, and application code zip or war (e.g., a web application artifact, a packaged code build for the web that is Java specific). It is noted that artifacts can be specific to a named environment or to a defined system.

DEFINED SYSTEM—A collection of related applications. Ownership information is specified at a defined system level (roles, Inventory Database of System Assets tier, etc.). Defined system information can be used for, for example, cost analysis functions. Examples of defined systems may include AMS web services, AMS batch applications, AMS windows services, and AMS database definitions. Information to store about defined systems may include: system id (e.g., for operations and cost analysis); ownership information (e.g., for operations and cost analysis); cost analysis metrics (for cost analysis); etc.

For inventorying, a defined system may be associated with a business unit, and may have one or more managers who are in charge of the defined system, from an IT perspective. The defined system may also have a business stakeholder that is the decision maker from the business side. Each defined system may be associated with a business process or function that has one or more stakeholders (personnel, managers, etc.) and that is implemented using one or more applications. The defined system may be the highest level of organization in such a DevOps approach.

NAMED ENVIRONMENT—a named collection of deployments. In an embodiment, each named environment is related to one and only one defined system. In alternative embodiments, named environments may be related to more than one defined system. Information to store about named environments may include: environment name, which is unique per system (e.g., for operations and cost analysis); system ID (e.g., for operations and cost analysis); collection of deployments; and orchestration information for lifecycle events, such as order of on/off, etc. (e.g., for operations).

The named environment may be the next level of organization under system. It could be a representation of the production footprint of the defined system in terms of applications, versions, resources used, etc. Each named environment is characterized by having a name, and a set of applications and resources on which the applications are running.

In an example embodiment, a defined system may include multiple named environments, with each environment being associated with multiple applications. The defined system may include, for example, a production environment and a quality environment. In certain embodiments, the production environment is where real-world transactions are performed, and the quality environment is a quality assurance environment against which change testing is performed without impacting the stability or availability of production environment.

ECOSYSTEM—A named collection of named environments. Ecosystems may serve as an organization mechanism to group environments that are integrated together even if they are in multiple systems. Information to store about ecosystems may include: ecosystem name, which is universally unique (e.g., for operations and cost reporting); collection of application environments; and orchestration information for ecosystem lifecycle events, such as order of on/off, etc. (e.g., for operations).

DEPLOYMENT LOG—Information about how a given application uses resources within one named environment. Information to store in deployment logs may include: what was deployed, such as the versions of artifacts within each application under a named environment; when it was deployed, such as time and history information; and where it was deployed, such as an association of resources to artifacts.

As indicated above, each named environment could be associated with a set of applications. Each application could have a set of artifacts, and each artifact may have its own version that is traceable. A named environment could have a list of resources on which those applications are running, such as servers and other computing resources that are being used by that named environment. A named environment could further include a log of deployments that identifies what was deployed and when (by date and time). The log would include details of each deployment, such as: what was changed from the last deployment, what are new versions, what are the old versions, etc. Multiple (or all) named environments may include the same stack of applications. Each web service may also be enumerated as an application in each named environment.

Artifacts under each application may represent the code that the development teams have compiled. There may be, for example, an artifact representing the platform configuration that those applications need in order to run. So, for example, an artifact may identify that the code is running on a Windows server with certain file folder permissions. User identity may also be expressed as artifacts under those applications.

Information on resources used provides a way to trace back costs associated with development. The cost can be traced back to, for example, the named environment level, the application level, and/or the defined system level. Using inventory information at the system level, the costs can be provided to managers, business units, etc., for more informed decisions regarding how to use resources. This allows for a better understanding of costs.

Advantageously, this approach provides a consistent, repeatable, immutable way to deploy in different environments. Artifacts (such as the application code, the platform configuration, etc.) may all be expressed as code, and this organization allows deployments of either the same version or a new version of any of those artifacts in selected named environments, with the deployment occurring in a consistent, immutable way.

As an example use case in various embodiments, a developer may be making a code change, and part of that code change may also require that the amount of memory on the associated machine be increased (e.g., from one gigabyte of RAM to two gigabytes of RAM) in order for that change to work. Without the disclosed DevOps approach, the developer may have made that code change, then coordinated the specific time of day with a platform engineer to simultaneously change the server configuration at the same time that the code is pushed out. This would result in an outage, and it would be a manual process that is not easy to duplicate across multiple instances or across multiple environments.

With example embodiments, the change being made by the developer may be reflected as code on the developer side that is one artifact that would have a new version, and the change to the server configuration may be another artifact that was registered by the platform engineers independently and asynchronously from the developer's work. Once it is time to actually perform a deployment, the developer has the flexibility to schedule that deployment with the new version of both artifacts at their time without having to coordinate and have an event with multiple people "in the room" in order for that deployment to succeed.

Figure 3:
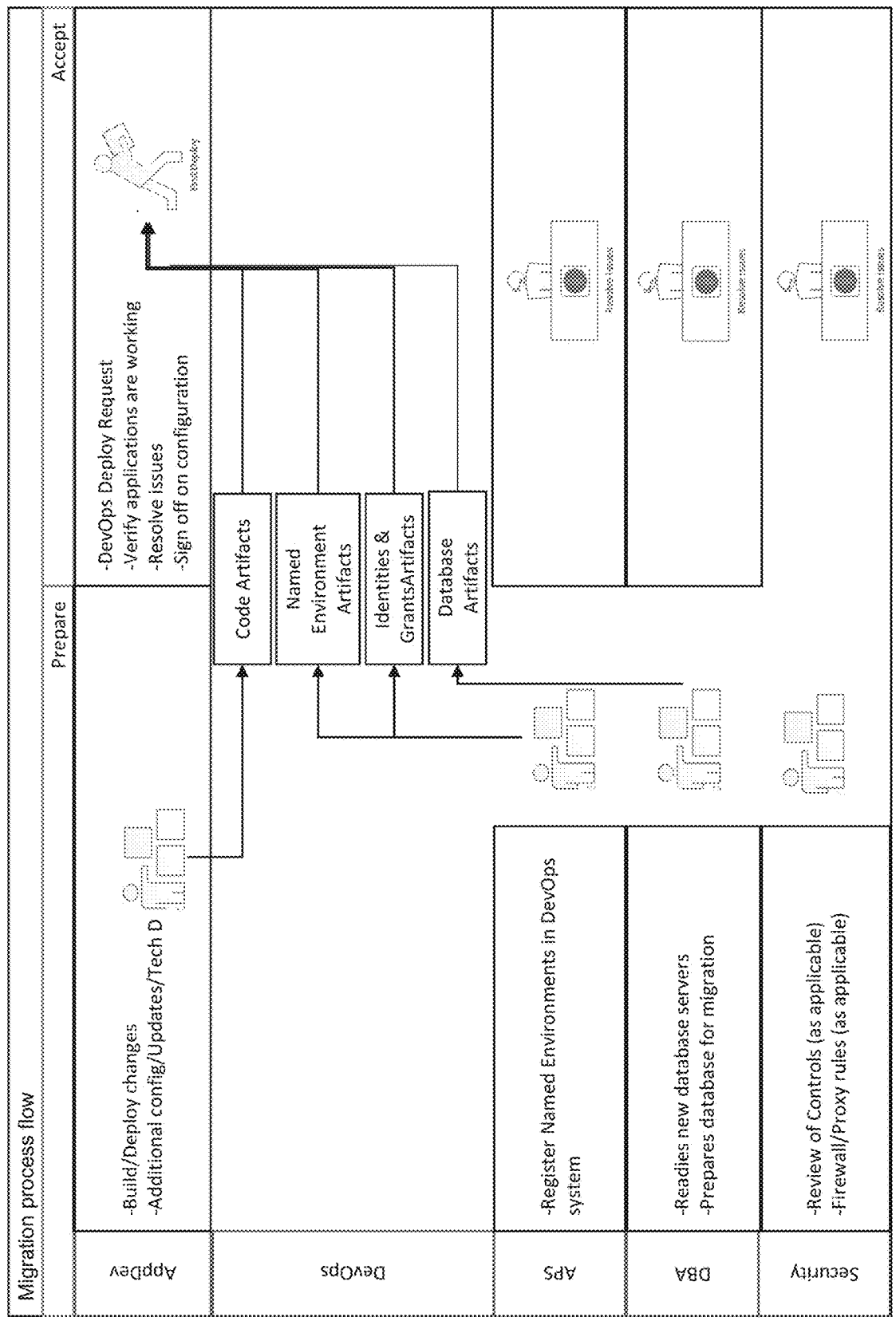
FIG. 3 is a flow diagram for an example migration process flow, depicting how various teams may register artifacts and deploys may be triggered by applications development, according to one or more embodiments.

Referring to FIG. 3, an example migration process flow is shown for an embodiment of an example DevOps system. FIG. 3 shows how various teams register artifacts into the DevOps system. Deployments are then triggered by applications development (AppDev). On the preparation side, security involves review of applicable controls and applicable firewall/proxy rules. One or more database administrators (DBAs) ready new database servers and prepare databases for migration and may enter database artifacts into the DevOps system. Another team may enter identities and grant artifacts and named environment artifacts into the DevOps system. And the AppDev team may enter code artifacts into the DevOps system. The AppDev team may build and deploy changes to the code and provide configuration changes and updates. The artifacts in DevOps may be used in a first deployment. This may involve receipt of a DevOps deploy request, verification that applications are working, and signing off on configuration. One or more of the various teams may resolve issues as they arise after a deployment has been accepted.

FIG. 3 represents an example migration from existing systems onto example embodiments of the invention. On the "Prepare" side, developers and platform engineers are preparing artifacts. On the "Accept" side, the first deployment to a single named environment is occurring and the developers are "accepting" that the artifacts created are valid and correct for their defined systems. This then allows the remaining named environments to be stamped out from the "Accepted" one.

It is noted that "code artifacts" refers to pieces of code to be deployed. With respect to, "Named Environment Artifacts," some artifacts may be generic and can be used in any environment while others may be environment specific. "Identities and Grants Artifacts" describe the identity(ies) that will be running the application in a named environment, and grant(s) of permissions required (database, file system, etc.). "Database Artifacts" are a representation of a database that is owned or used by the system in this named environment. This facilitates the promotion of database schema changes within the deploy. With respect to "First Deploy," an additional process of "Acceptance" may occur that may not occur with subsequent deploys.

An example graphical user interface for a DevOps system implementation is depicted in FIG. 4. The graphical user interface in FIG. 4 shows existing deployments that are either "in progress" or "completed." The depicted page shows the system ("System Asset," corresponding with an Inventory Database of System Assets "KeyCode") and named environment for each deployment. This screen may be used, for example, by developers and IT managers to view deployments that have been created.

The bottom of FIG. 4 depicts an expansion of deployment 41682 (last row), which may occur upon selection of the corresponding row, such as by movement of a cursor (e.g., a mouse cursor) so that it hovers over one of the fields in the first row, and selection of the row (e.g., by depressing of a mouse button or touchscreen). Deployment 41682 is identified as being "In Progress". This expansion shows more detail about the applications deployed and the corresponding artifacts.

For deployment 41682, it can be seen, for example, there are five applications (A, B, C, D, and E). Under each application, one or more artifacts involved in the deployment may be identified. Deployments may include organizational applications that house artifacts that are not application specific, such as a machine that is shared by multiple applications. Listed artifacts may identify resources, platforms, identifies (such as the identities of the personnel and/or of other components associated with deployment 41682), and code, as discussed. An icon indicating that there is a "Newer Version Available" may refer to a new piece of code as well as any other artifact that has an update.

FIG. 5 provides an example deployment request graphical user interface that can be used by a developer or other user to create a new deployment or request a change to a created deployment. Such a graphical user interface may be used, for example, each time there is a new application or there is a new version of one or more artifacts for an existing environment. As shown, this graphical user interface allows a developer to select a system (e.g., System 1) and named environment (e.g., TEST). In certain implementations, applications may be populated based on the presence of recorded artifacts. The default entries may be populated based upon the last deployment to this environment. In other words, the user may be presented with the current state and asked "what should be changed with this deployment?" Regarding "Request Type," there may be, for example, three types: standard, infrastructure, and emergency. In certain embodiments, in all non-production environments, standard may be the only selection. However, different approval processes may be implemented, if desired. The "Estimated Deployment Time" (in FIG. 5, 10 minutes and 40 seconds)

may be based on, for example, the average of the last five (or other number) of deployments for this named environment. In some implementations, the estimated deployment time may be based on a sum of the average times for each task performed (i.e., to implement changes identified in artifact files) in multiple deployments even if the tasks were performed with respect to different applications and/or different named environments.

"SQL Requests" may use the database artifact to look up whether any pending changes are available from database administrators. The "deployer" (e.g., user who is requesting a deployment) may then select from the available pending changes and choose an order of execution including whether the change occurs before code deploy ("Pre-Code Deploy") or after code deploy ("Post-Code Deploy").

A deployment request allows for the addition of various applications. In FIG. 5, "[Common]" corresponds with items shared across all the applications in the corresponding named environment. Also listed is Application "A," for which there is a newer (updated) version, as indicated by the "Newer Version Available" indicator. For example, there is a newer version of the code artifact than the default version that is populated when Application "A" is first added (by activating the "Add Application" link and selecting or identifying Application "A").

Figure 6:
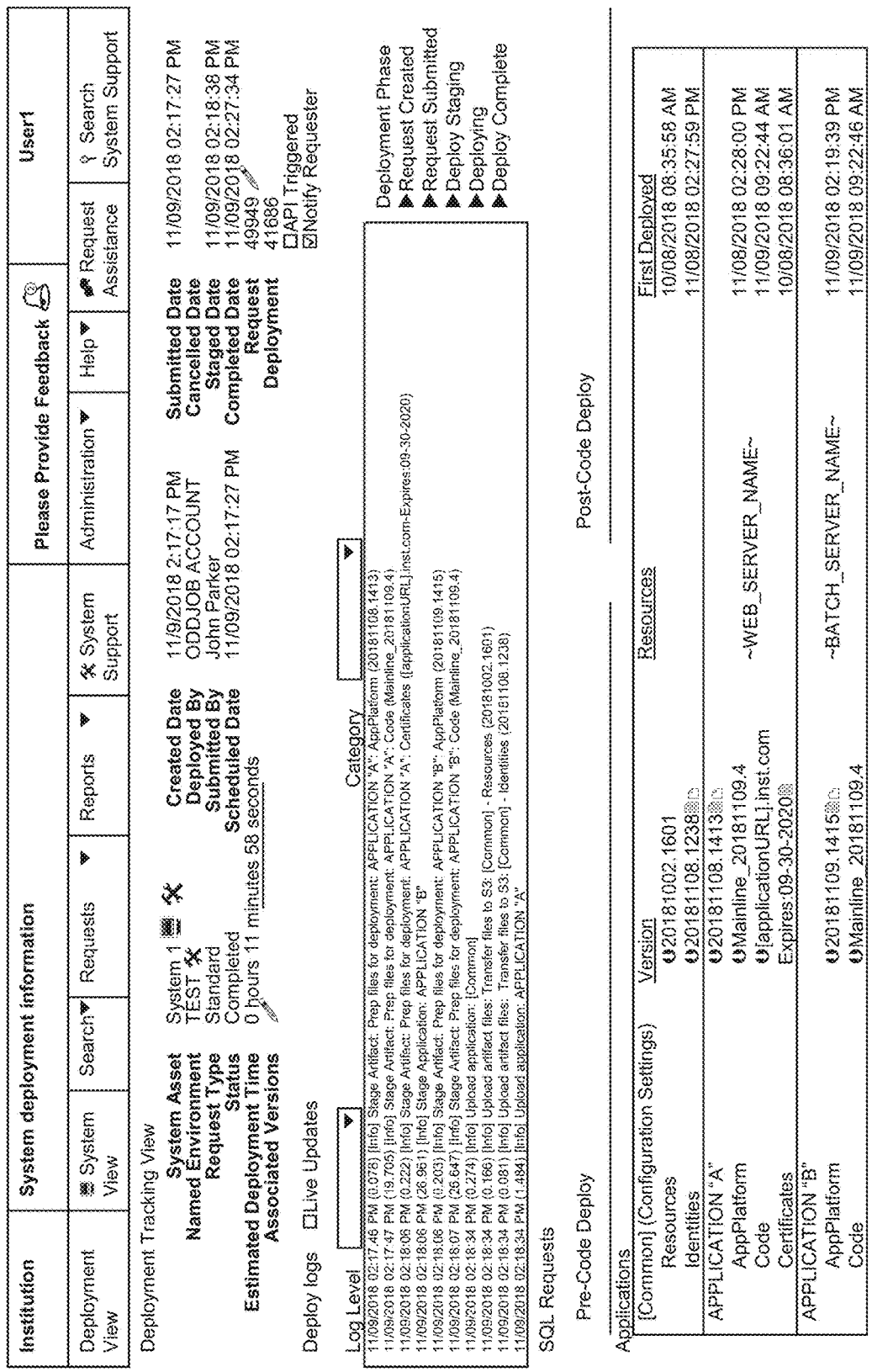
FIG. 6 shows an example deployment tracking graphical user interface showing a set of details for a single deployment, according to one or more embodiments.

FIG. 6 provides a deployment tracking graphical user interface. In FIG. 6, additional details behind a deployment can be seen. For deployment 41686 (which is identified as being "completed" under "Status"), the associated defined system (System 1), named environment (TEST), date/time of creation, scheduling, and submission, user account used to create the deployment (ODDJOB ACCOUNT), and user who submitted the deployment (John Parker), are indicated. A log of the steps associated with the deployment are shown, as are the associated applications.

FIG. 7 provides an example deployment support graphical user interface viewable to "User1." In FIG. 7, the deployment corresponds with named environment TEST, a non-production environment that is associated with System 1. The graphical user interface allows for entry of reasons for the deployment in the text box adjacent to "Purpose." For the deployment, the resources (e.g., servers), databases, and associated deployments involving prior versions of the corresponding artifacts. If a deployment is not successful (e.g., because of a serious incompatibility of the code with the resources and/or platform), one or more users may be notified of a deployment failure. The users may return to a prior deployment that was known to have worked, or change the current deployment request to, for example, use a different artifact. For minor issues (e.g., a user interface does not function as intended), a deployment may be effectively successful and a production issue (e.g., an issue ticket) may be generated to resolve the issue via another deployment. In an example deployment, a developer may select specific versions of each artifact that will be deployed. When a deploy is executed, all of the selected artifacts are staged and picked up to deploy. Example stages in a backend deploy execution may include:

Preparing to deploy—Workspace is readied, and latest orchestration scripts are loaded. All artifacts from requested deploy may be brought into workspace. DevOps system is contacted to begin a new deployment for this environment. If another deployment for this system/environment is currently in progress, this step may wait until the in-progress deployment is finished.

Identities, Grants, and Injections—Identity and Grants artifacts are examined and existence of identities and grants is validated. Identities injection is performed on other artifacts that need to look up an identity value.

Pre-requisites—Verifying that all artifacts meet expectations of the orchestration engine, and any setup work is prepared.

Check Status—Check status and attributes of currently deployed hardware.

Infrastructure—Use the resources artifact to build/change all resources required for the environment Configure Server—Push down rules for configuring server requirements.

Pre-Deploy Hook—If artifacts of type "Pre-Deploy Hook" exist, execution may occur at this step.

Application Platform—Use the platform artifacts as input to configure the platform Instance Tagging—Adding metadata tags to resources to assist with various operations including inventory.

Code—Prepare and deploy the code artifacts for each application

Post-Deploy Hook—If artifacts of type "Post-Deploy Hook" exist, execution may occur at this step.

Load balancer automation—Create/update load balancers to reflect the desired state of resources and platform artifacts and verify connectivity.

DNS—Create/update DNS records as defined in the platform artifacts.

Post-Deploy Cleanup—Log the completion of the deployment to DevOps system, and clean up the workspace.

Additional details and advantages can be found in the Appendix, in which an example DevOps system having one or more embodiments that are illustrative of example features discussed in this disclosure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A development and operations (DevOps) method for managing a portfolio of applications in an enterprise using an inventory of artifacts, each artifact being an immutable versioned component of a deployable application in the enterprise, the method comprising:
   generating a set of artifacts associated with a named environment of a defined system in the enterprise, the set of artifacts including:
      a first artifact file identifying computing hardware resources in the named environment;
      a second artifact file identifying software specifications in the named environment;
      a third artifact file with executable code to run in the named environment using the computing hardware resources identified in the first artifact file and the software specifications identified in the second artifact file; and
      a fourth artifact file identifying an identity of an entity used to run the application or authorize use of the application;
   creating a deployment by selecting one or more applications and, for each application, the first, second, third, and fourth artifact files of the set of artifacts; and
   deploying the set of artifacts by virtually modifying one or both of the computing hardware resources and the software specifications in the named environment according to the first and second artifact files, respectively, and running the code from the third artifact file in accordance with the fourth artifact file.

2. The method of claim 1, further comprising registering versioned artifacts in the inventory of artifacts via a common application programming interface (API).

3. The method of claim 1, wherein the fourth artifact file includes identities of entities for which permissions is required to run the application in the named environment.

4. The method of claim 1, wherein the deployment is created via a deployment request graphical user interface.

5. The method of claim 1, wherein artifacts are selected by an identifier and a version.

6. The method of claim 1, wherein the defined system corresponds with a business role and one or more stakeholders.

7. The method of claim 1, further comprising determining a cost associated with an application based on expenses incurred for corresponding virtual modifications to the named environment made according to selected artifacts.

8. The method of claim 7, further comprising determining a total cost associated with the defined system based on expenses incurred for modifications to named environments in the defined system.

9. The method of claim 1, further comprising generating a cost report identifying expenses for at least one of:
   a set of one or more deployments;
   a set of one or more applications;
   a set of one or more named environments; and
   a set of one or more defined systems.

10. A development and operations (DevOps) system for managing a portfolio of applications in an enterprise using an inventory of artifacts, each artifact being an immutable versioned component of a deployable application in the enterprise, the system comprising a processor and a memory having instructions stored therein that, when executed, cause the processor to:
    generate a set of artifacts associated with a named environment of a defined system in the enterprise, the set of artifacts including:
       a first artifact file identifying computing hardware resources in the named environment;
       a second artifact file identifying software specifications in the named environment;
       a third artifact file with executable code to run in the named environment using the computing hardware resources identified in the first artifact file and the software specifications identified in the second artifact file; and
       a fourth artifact file identifying an identity of an entity used to run the application or authorize use of the application;
    create a deployment by accepting selections of one or more applications and, for each application, the first, second, third, and fourth artifact files of the set of artifacts; and
    deploy the set of artifacts by virtually modifying one or both of the computing hardware resources and the software specifications in the named environment according to the first and second artifact files, respectively, and running the code from the third artifact file in accordance with the fourth artifact file.

11. The system of claim 10, wherein the instructions further cause the processor to register versioned artifacts in the inventory of artifacts via a common application programming interface (API).

12. The system of claim 10, wherein the fourth artifact file includes identities of entities for which permissions is required to run the application in the named environment.

13. The system of claim 10, wherein the system further includes one or more user interfaces configured to receive user inputs and visually present graphical user interfaces, and wherein the instructions are further configured to cause the processor to accept selections of applications and/or artifacts via a deployment request graphical user interface.

14. The system of claim 10, wherein the deployment request graphical user interface is configured to accept selections of artifacts by identifier and version.

15. The system of claim 10, wherein the defined system corresponds with a business role and one or more stakeholders.

16. The system of claim 10, wherein the instructions further cause the processor to determine a cost associated with an application based on expenses incurred for corresponding virtual modifications to the named environment made according to selected artifacts.

17. The system of claim 16, wherein the instructions further cause the processor to determine a total cost associated with the defined system based on expenses incurred for modifications to named environments in the defined system.

18. The system of claim 10, wherein the instructions further cause the processor to generate a cost report identifying expenses for at least one of:
a set of one or more deployments; a set of one or more applications;
a set of one or more named environments; and a set of one or more defined systems.

19. A non-transitory computer readable medium having machine instructions stored thereon, the instructions being executable by a processor of a development and operations (DevOps) system to cause the processor to perform operations for managing a portfolio of applications in an enterprise using an inventory of artifacts, each artifact being an immutable versioned component of a deployable application in the enterprise, the operations comprising:
generating a set of artifacts associated with a named environment of a defined system in the enterprise, the set of artifacts including:
a first artifact file identifying computing hardware resources in the named environment;
a second artifact file identifying software specifications in the named environment;
a third artifact file with executable code to run in the named environment using the computing hardware resources identified in the first artifact file and the software specifications identified in the second artifact file; and
a fourth artifact file identifying an identity of an entity used to run the application or authorize use of the application;
creating a deployment by selecting one or more applications and, for each application, the first, second, third, and fourth artifact files of the set of artifacts; and
deploying the set of artifacts by virtually modifying one or both of the computing hardware resources and the software specifications in the named environment according to the first and second artifact files, respectively, and running the code from the third artifact file in accordance with the fourth artifact file.

20. The medium of claim 19, wherein the instructions further cause the processor to register versioned artifacts in the inventory of artifacts via a common application programming interface (API).

* * * * *